United States Patent
Cook

(10) Patent No.: US 7,266,089 B2
(45) Date of Patent: Sep. 4, 2007

(54) SYSTEMS AND METHODS FOR CREATING A WIRELESS NETWORK

(75) Inventor: Charles I. Cook, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 10/370,938

(22) Filed: Feb. 21, 2003

(65) Prior Publication Data

US 2004/0165545 A1   Aug. 26, 2004

(51) Int. Cl.
*H04L 12/56* (2006.01)
(52) U.S. Cl. ...................... 370/254; 370/338
(58) Field of Classification Search ............... 370/254, 370/255, 338
See application file for complete search history.

(56) References Cited

U.S. PATENT DOCUMENTS

| | | | |
|---|---|---|---|
| 6,512,755 B1 | 1/2003 | Deschaine et al. | |
| 6,529,909 B1 | 3/2003 | Bowman-Amuah | |
| 6,549,949 B1 | 4/2003 | Bowman-Amuah | |
| 6,550,057 B1 | 4/2003 | Bowman-Amuah | |
| 7,075,912 B2 * | 7/2006 | Suda et al. | 370/331 |
| 2004/0052223 A1 * | 3/2004 | Karaoguz et al. | 370/328 |
| 2004/0054804 A1 * | 3/2004 | Li | 709/239 |

OTHER PUBLICATIONS

Harry Newton, Newton's Telecom Dictionary, 1995, Flatiron Publishing, Inc. pp. 178 and 1269.*
Benny Pinkas et al., 'Securing Passwords Against Dictionary Attacks', CCS'02, ACM 1-58113-612-9/02/0011, Nov. 2002, pp. 161-170.*
Mirela S.M.A. Notare et al., 'Safety and Security for 2000 Telecommunications', 2000 IEEE, 0-7803-6323-X/00/$10.00, pp. 359-363.*

* cited by examiner

*Primary Examiner*—Melvin Marcelo
(74) *Attorney, Agent, or Firm*—Townsend and Townsend and Crew LLP

(57) ABSTRACT

Systems and methods for transferring information are described herein. Some of the systems include one or more wireless access points providing access to a network for wireless client devices. In addition, the systems can include a modem coupling the wireless access point(s) to a network that includes a central gateway operable to authorize access to the network via the wireless access point. In some cases, the wireless access point is located at a customer premises. Various methods are also described for transferring information over a wireless network. Such methods can include receiving a request from a wireless client device at a central gateway via a wireless access point located at a customer premises, and authorizing access to a network associated with the central gateway. Other methods can include receiving multiple requests from the same wireless client device via different access points as the wireless client device moves from location to location.

16 Claims, 11 Drawing Sheets

SYSTEMS AND METHODS FOR CREATING A WIRELESS NETWORK

BACKGROUND OF THE INVENTION

The present invention provides systems and methods for transferring information via a computer network. More particularly, the present invention relates to wireless and/or wireline networks that can be controlled from a central location.

The Institute of Electrical and Electronics Engineers ("IEEE") promulgated the wireless local area network ("LAN") standard, in the IEEE 802.11 Working Group. Promulgation of the standard has generated various activities related to the development and implementation of small scale wireless networks and discussions of large scale wireless networks. In typical implementations, wireless access points are provided at various locations that allow a user with a wireless client device to access a network. These wireless access points may include functionality designed to authorize access to the network. Thus, when accessing the network, a wireless client device is authorized at the wireless access point, and then allowed to access various points of the network. Thus, much like the front door to a home, existing networks intuitively provide limited gateway functionality at the entrance point to the network, or the wireless access point. However, such an approach is often either costly, limited in functionality, or both.

Wireless networks can utilize a number of access points 102 depicted in FIG. 1a. As illustrated, access point 102 can include a central point 101 where the access point is implemented, and a radius 103. Radius 103 is the maximum distance at which information can be transferred using access point 102. It has been reported that for an access point 102 operating in compliance with regulations provided by the Federal Communications Commission ("FCC"), radius 103 is approximately one thousand, eight hundred feet for outdoor transmission, and approximately nine hundred feet for indoor transmissions. Thus, providing coverage for a large metropolitan area could require thousands, or even tens of thousands of access points arranged as depicted in FIG. 1b. The cost structure for access points makes such an endeavor commercially possible, however, the costs for servicing such a system and obtaining rights to install such a system are prohibitive.

In part to address this significant cost burden, some companies have experimented with high power, point-to-point access points. Such access points, through use of high-gain directional antennas, have been reported to allow transfers from wireless client devices operating as much as twenty miles away. To comply with FCC regulations, such access points are designed to operate as a point-to-point device for one period, then move the direction of the point-to-point beam to a second direction for another period. An example of a high power, point-to-point access point 202 is depicted in FIG. 2. As illustrated, transfers are facilitated over a direction 204a, then a few milliseconds later, the beam is pointed in a direction 204b. As depicted by arc 205, this process is repeated again and again until a three-hundred, sixty degree radius around a central point 201 is completed at direction 204n. Then, the process begins again at direction 204a. As will be appreciated, while the approach reduces the number of access points that must be implemented and serviced, the approach is complex and costly.

Thus, there exists a need in the art for systems and methods that address the aforementioned problems, as well as other limitations of the existing art.

BRIEF SUMMARY OF THE INVENTION

The present invention provides systems and methods for transferring information via a computer network. More particularly, the present invention relates to wireless networks, and methods of using such.

In some embodiments, the present invention includes installing and operating wireless access points at a customer premises. Thus, for example, a customer coupled to a network via a modem can attach a wireless access point to the modem, and wireless client devices of the customer and others can access the network via the wireless access point. By installing the wireless access point at the customer premises, costs involved with obtaining rights to install access points and/or service access points can be reduced.

In various embodiments, access points used in relation to the present invention exhibit reduced functionality. For example, in some cases, the gateway functionality associated with an access point is eliminated, or the level of authorization modified. In such cases, the gateway functionality is implemented in a central gateway. In part because of the central location of the gateway, enhanced gateway services can be implemented, and costs associated with maintaining the gateway services can be greatly reduced. The function of the access point can be substantially reduced, thus limiting the cost of such devices. As such, servicing the access point can be done by simply replacing the access point. Accordingly, such embodiments of the present invention limit, or even eliminate the need for a Carrier to go to the location of an access point. In addition, such embodiments provide a central gateway that can scale to service a large number of access points.

Further, various embodiments of the present invention provide systems and methods to manage the number of devices that an end user connects to the network. By using the central gateway, devices accessing the network can be authorized in a central location. This avoids the situation where a neighbor installs a wireless access point, and resells access to the network to those living in surrounding homes. Further, various embodiments reduce the possibility that a wireless access point is left without security features, thus allowing anyone to access the network resulting in congestion and/or revenue losses to the customer maintaining the access point, and/or the Carrier maintaining the network.

In some cases, where an unauthorized access is detected, a user can be redirected to a web page that includes directions on how to register for and purchase network services. Further, some cases allow a Carrier to rate shape the data such that shared access to a single bandwidth source is maintained. This can be done while adhering to service agreements guaranteeing a specific level of service and/or bandwidth. Yet further, some embodiments of the present invention allow a Carrier to create a community of interest by enabling both wireline and wireless subscribers to roam to other points in the network and gain access at various points using their own passwords, and service plans.

Particular embodiments of the present invention provide systems for transferring information. The systems include a wireless access point, and a modem coupling the wireless access point to a network. The network includes a central gateway operable to authorize access to the network via the wireless access point. In some cases, the wireless access point is located at a customer premises, and can be a Wi-Fi access point. The modem can be, for example, an xDSL modem, or other modem capable of communicating with the network, any other device in the network, or any other network access device.

In some cases, the central gateway includes computer software that is executable to receive a request from a wireless client device via the wireless access point. Based at least in part on the request, access to the network can be denied or authorized, or a user may be redirected to a web page displaying subscription directions. Authorizing access can include accessing a database that indicates authorized wireless client devices and/or suspicious wireless client devices.

In some cases, a computer is also coupled to the network via the modem. In such cases, rate shaping can be provided such that the computer has access to a given amount of the bandwidth offered via the modem, and the wireless client device has access to another given amount of the bandwidth. In various cases, billing information is provided such that the user of the computer is charged for access by the computer, while the user of the wireless client device is charged for access associated with the wireless client device.

Other embodiments of the present invention provide methods for transferring information. Such methods include receiving a request from a wireless client device at a central gateway. The request is received via a wireless access point located at a customer premises. Based at least in part on the request, access to the network is authorized by the central gateway. In some cases, the methods further include receiving a request from a computer coupled to the network via a modem. In addition, the methods can include rate shaping, billing, and support for roaming.

Yet other embodiments provide methods for transferring information to and/or from a roaming client device. The methods include receiving a first request from a roaming client device at a central gateway via a first wireless access point located at a first customer premises. Access to the network is authorized by the central gateway, and a response to the first request is provided. Subsequently, a second request from the roaming client device is received at the central gateway via a second wireless access point located at a second customer premises, and a response to the second request is provided.

Yet further embodiments provide methods for extending network coverage. The methods include identifying a network edge of a network, and supporting a wireless access point installed at a customer premises located near the network edge. Thus, a wireless client access device beyond the network edge can access the network. Supporting the wireless access point can include providing at least one service selected from the group consisting of: billing, rate shaping, and authorizing.

This summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
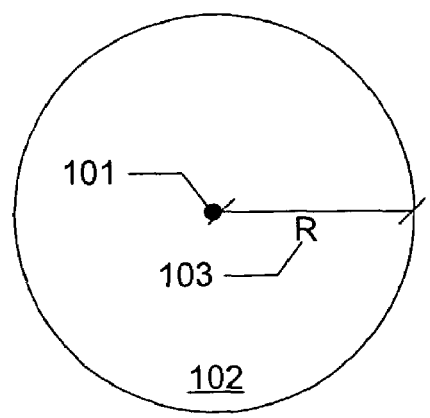
FIGS. 1a and 1b illustrate existing wireless access points, as well as implementations of multiple such access points.
Figure 1B:
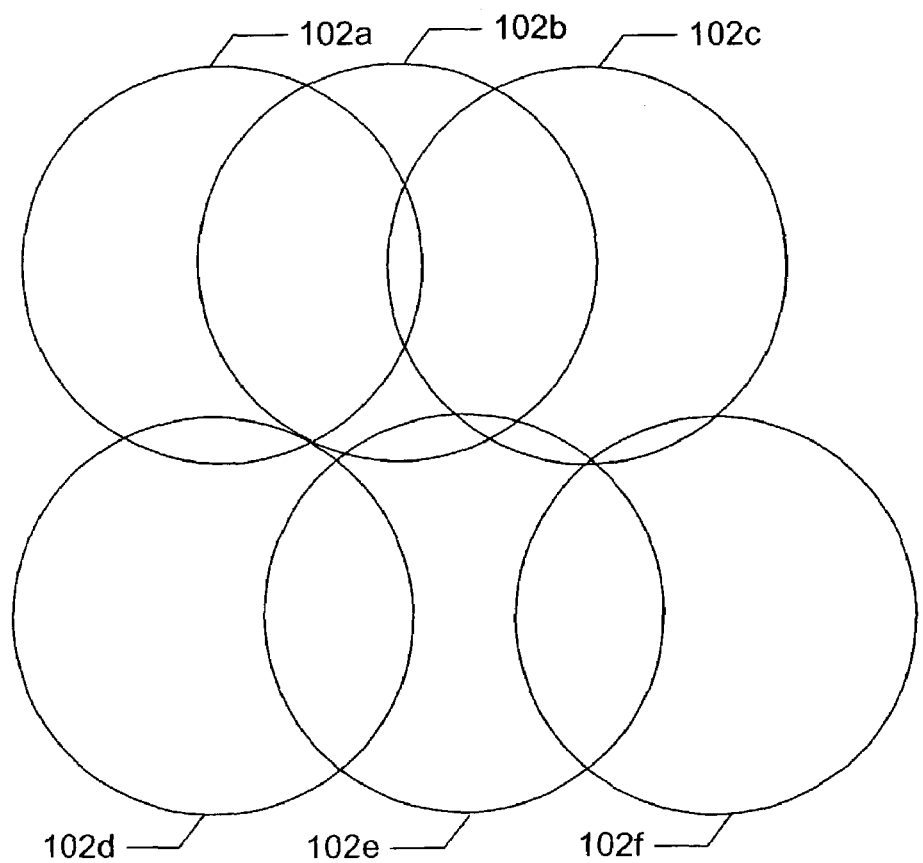

The present invention provides systems and methods for transferring information via a computer network. More particularly, the present invention relates to wireless networks, and methods of using such.

In various cases, the present invention includes installing and operating wireless access points at a customer premises, or another location within an existing network. Thus, for example, a customer with wireline (e.g., a copper or fiber optic connection) access to a network can install a wireless access point, so that allowing wireless client devices of the customer and others can access the network via the wireless access point. By installing the wireless access point at the customer premises, costs involved with obtaining rights to install access points can be reduced. As used herein, the term "customer premises" is intended to refer to physical structures or open real property adjacent to a physical structure that is under the control of a customer through ownership, leasehold, or any other property right. Such a definition reflects the attribute that by functioning at a customer premises, the Carrier does not need an additional easement to place equipment at the location. As an example, in the case of a residential customer, the customer premises may correspond to the customer's home and/or yard surrounding the home. Further, for the purposes of this document, a "wireless access point" can be any type of wireless receiver, transmitter, and/or transceiver that provides network access to client devices.

As used herein, a wireless access point can be any device that provides a wireless interface to a network. Similarly, a wireless or roaming client device can be any device that can access a network via a wireless access point. A special subset of both wireless access points and wireless client devices are "Wi-Fi devices". Such Wi-Fi devices can be any wireless client device, or wireless access point that complies with the wireless standards developed in association with IEEE 802.11, including, for example, IEEE 802.11(a), IEEE 802.11(b), an IEEE 802.11(g). Thus, for example, a Wi-Fi device can be a compliant modem, personal digital assistant ("PDA"), cellular telephone, laptop computer, pager, commercially available access point, and the like. As will be appreciated, these devices can be Wi-Fi enabled meaning that they may have Wi-Fi technology embedded in them. However, it should also be appreciated that the present invention is not limited to Wi-Fi technology, but can also be applied to other wireless access technologies including, but not limited to, MMDS, LMDS, UWB, and the like.

In some cases, wireless access points used in relation to the present invention exhibit reduced functionality from others that are commercially available. For example, in some cases, the gateway functionality associated with an access point is eliminated, or reduced. As used herein, "gateway functionality" includes a number of functions associated with accessing and/or using a network. For example, gateway functions can include authentication and/or authorization. In addition, gateway functionality can include billing and rate shaping functions. Yet further, gateway functions can include updating or modifying various equipment associated with the network. For example, gateway functionality can include programming one or more wireless access points attached to the network from a central location. Based on the disclosure provided herein, one of ordinary skill in the art will appreciate a number of other gateway functions in addition to the aforementioned examples.

In the cases where gateway functionality is reduced or eliminated at the wireless access point, the gateway functionality can be implemented in a central gateway. As used herein, a "central gateway" is a gateway responsible for providing gateway functions in relation to multiple access points on a network. In some cases, a central gateway is implemented at the home office, or other generally accessible location of a Carrier. In part because of the central location of the gateway, enhanced gateway services can be implemented, and costs associated with maintaining the gateway services can be greatly reduced. The function of the access point can be substantially reduced, thus limiting the cost of such devices. As such, servicing the access point can be done by simply replacing the access point. Accordingly, such embodiments of the present invention limits the need for a Carrier to go to the location of an access point. In addition, such embodiments provide a central gateway that can scale to service a large number of access points.

Further, various embodiments of the present invention provide systems and methods to manage the number of devices that an end user connects to the network. By using the central gateway, devices accessing the network can be authorized in a central location. This avoids the situation where a neighbor installs a wireless access point and resells access to the network to those living in surround homes. Further, various embodiments eliminate the possibility that a wireless access point is left without security features, thus allowing anyone to access the network resulting in congestion and loss of revenues.

In some cases, where an unauthorized access is detected, a user can be redirected to a web page that includes directions on how to register for and purchase network services. Further, some cases allow a Carrier to rate shape the data such that shared access to a single bandwidth source is maintained. This can be done while adhering to service agreements guaranteeing a specific level of bandwidth. Yet further, some embodiments of the present invention allow a Carrier to create a community of interest by enabling both wireline and wireless subscribers to roam to other points in the network and gain access at various points using their own passwords, and service plans.

Figure 3:
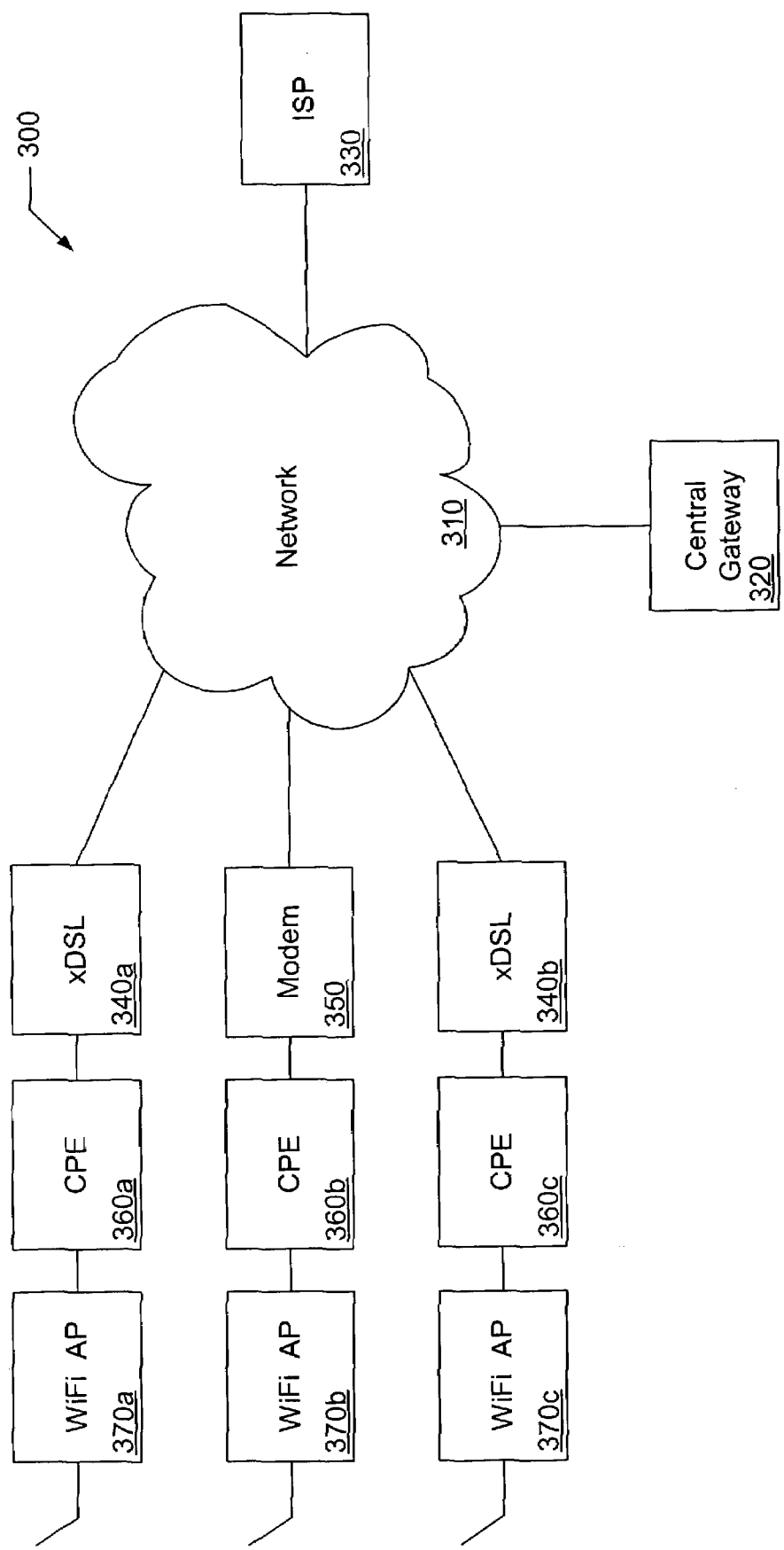
FIG. 3 illustrates a network in accordance with embodiments of the present invention that includes wireless access points and a central gateway.

Turning to FIG. 3, a system 300 in accordance with some embodiments of the present invention is illustrated. System 300 includes one or more customer premises equipment ("CPE") 360 that are coupled to a network 310 via some sort of a modem 340, 350 or other communication device. For the purposes of this document, a "modem" is any network access device including, but not limited to, a V.91 modem, an xDSL modem, a point-to-point wireless link, a cable modem, a fiber optic optical network termination, a fiber optic network unit, and the like. In various cases, the modems 340, 350 can be wireline connected to network 310, while in other cases, modems 340, 350 can be wirelessly coupled to network 310. One or more of CPEs 360 can be attached to a wireless access point 370, such as a Wi-Fi wireless access point. A Wi-Fi access point can also be directly connected to modem 340, 350 and/or integrated as part of modem 340, 350. In addition, system 300 includes a central gateway 320 that interacts with transfers entering network 310 via wireless access points 370, and/or other devices including CPEs 360 and modems 340, 350. In addition, an Internet service provider ("ISP") 330 is coupled to network 310 and is capable of providing access to Internet services via CPEs 360.

CPEs 360 and/or wireless access points 370 can be implemented in relation to or as part of a network interface device as is more fully described in U.S. patent application Ser. No.10/356,364, entitled "PACKET NETWORK INTERFACE DEVICE AND SYSTEMS AND METHODS FOR ITS USE," filed Jan. 31, 2003 and assigned to an entity common herewith; U.S. patent application Ser. No. 10/356,688, entitled "SYSTEMS, METHODS AND APPARATUS FOR PROVIDING A PLURALITY OF TELECOMMUNICATION SERVICES," filed Jan. 31, 2003 and assigned to an entity common herewith; U.S. patent application Ser. No. 10/356,338, entitled "CONFIGURABLE NETWORK INTERFACE DEVICE AND SYSTEMS AND METHODS FOR ITS USE," filed Jan. 31, 2003 and assigned to an entity common herewith, U.S. patent application Ser. No. 10/367,596, entitled "SYSTEMS AND METHODS FOR DELIVERING A DATA STREAM TO A VIDEO APPLIANCE," tiled Feb. 14, 2003 and assigned to an entity common herewith, and U.S. patent application Ser. No. 10/367,597, entitled "SYSTEMS AND METHODS FOR PROVIDING APPLICATION SERVICES," filed Feb. 14, 2003 and assigned to an entity common herewith. The entirety of each of the aforementioned applications is incorporated herein by reference for all purposes.

Figure 4:
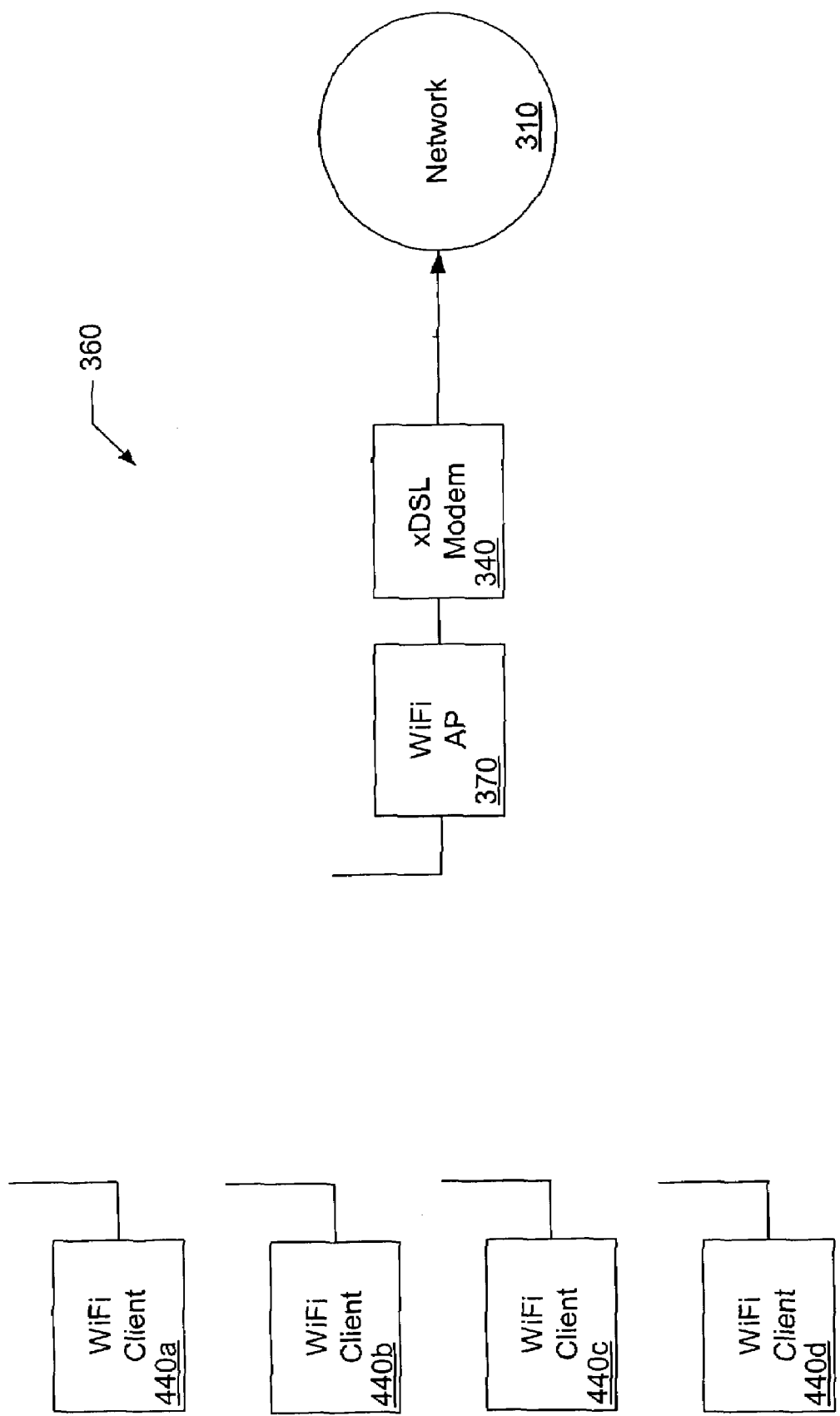
FIGS. 4 and 5 illustrate customer premises equipment in accordance with embodiments of the present invention, and associated with a network such as that depicted in FIG. 3.
Figure 5:
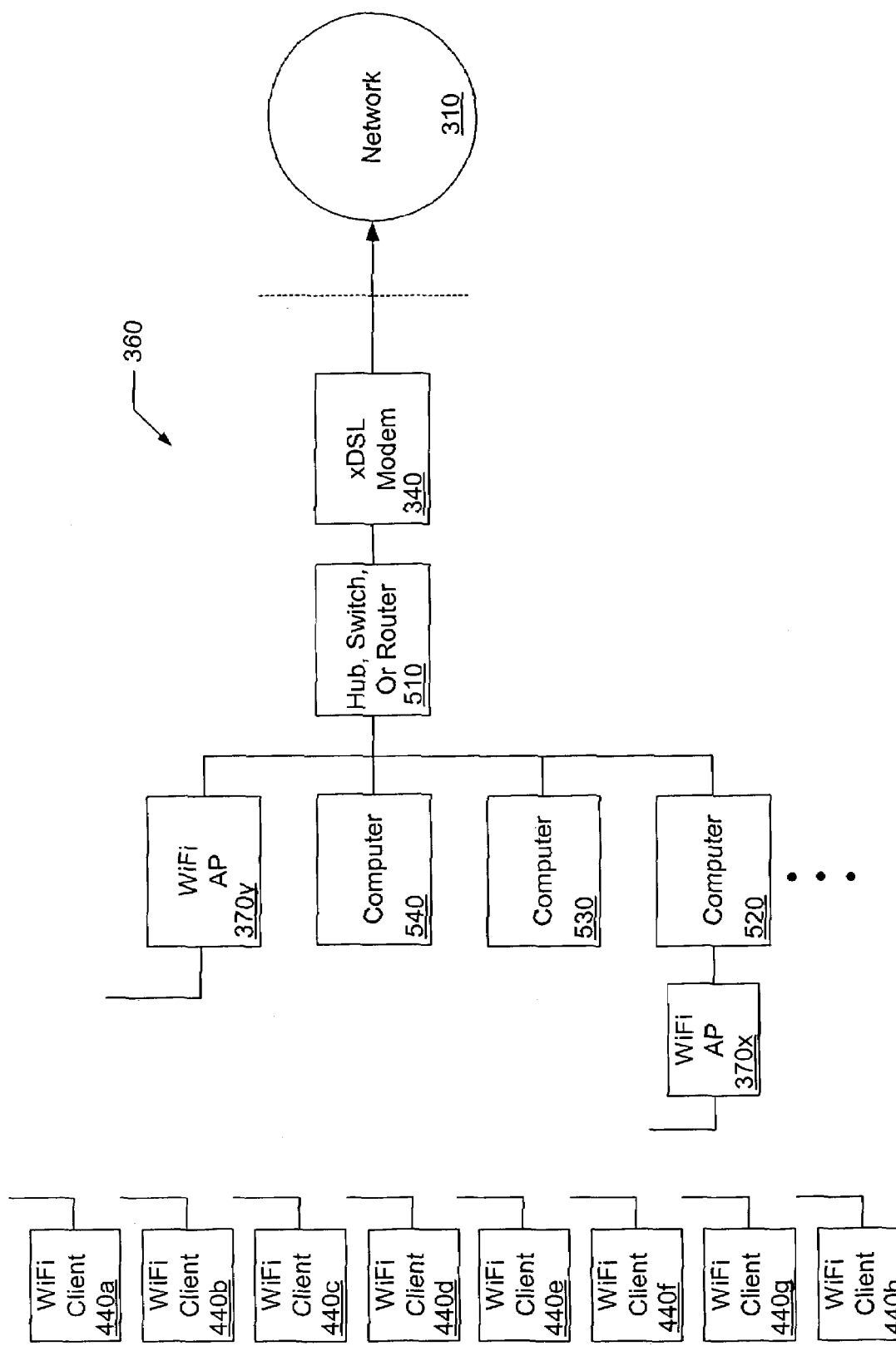

FIGS. 4 and 5 illustrate various configurations of CPEs 360 and various devices accessing network 310. Referring to FIG. 4, network 310 is accessible via a wireless access point 370 coupled to the network via a modem 340. As illustrated, four wireless client devices 440 are capable of accessing network 310 via wireless access point 370. In the existing art, the gateway functionality is implemented at wireless access point 370. Thus, wireless access point 370 is positioned for limiting the number of wireless client devices 440 that can access network 310. This can be problematic as implementing significant gateway functionality at wireless access point 370 can involve maintenance and support that may involve visiting the customer premises, and may further increase the cost of the gateway. Such an approach is often costly.

Additionally, there is often no incentive to implement gateway functionality, or only very limited gateway functionality at wireless access point 370. For example, a customer coupled to network 310 via modem 340 may decide to resell access to network 310. In this case, it is to the customer's advantage to limit the amount of gateway functionality. In this scenario, the Carrier implementing and maintaining network 310 would not realize revenues from this reselling process, but would end up supporting significantly more traffic from wireless client devices 440. It is conceivable that a large number of unauthorized devices and/or user could be accessing network 310.

In part to address one or both of the aforementioned scenarios, various embodiments of the present invention provide central gateway 320 that can be used to restrict access to the network and provide serviceability at a less costly, central location. Central gateway 320 can maintain a list of authorized devices. Thus, when an authorized wireless client device 440 accesses network 310 via wireless access point 370, the device can be authenticated and/or authorized using the list. In the situation where the wireless client device is not authorized, access can be denied, or the access can be redirected to a web page with directions on how to register and/or purchase service. In this way, a Carrier has the incentives to install and maintain network 310, and also has incentives to allow and even encourage wireless access to network 310.

Turning to FIG. 5, another CPE 360 is illustrated and shows the multiplicity of access points 370 (or other CPE 520, 530, 540) that can be supported. More specifically, a hub, switch, or router 510 couples a number of computers 520, 530, 540 and wireless access points 370 to modem 340, and in turn to network 310. Further, hub, switch, or router 510 can be another device registered with the network. Aspects of the present invention address such a situation where excessive bandwidth, or an excessive number client devices (wireless client devices 440, and wireline client devices 520, 530, 540) are accessing network 310.

In some embodiments, a certain number of client devices are indicated and identified at central gateway 320, and a charge for allowing that number of devices to access network 310 is defined. Where the number of devices exceeds a certain threshold, additional charges can be added. Thus, for example, a residential customer may contract with a Carrier to allow access to network 310 by ten different devices. The ten devices are registered with central server by, for example, providing the MAC addresses of each of the devices. Only these ten devices are allowed to access network 310. As will be appreciated by one of ordinary skill in the art, other identifying information such as passwords, serial number and the like may also be used in conjunction with or in place of the MAC address to register and/or authenticate client devices. Where a user desires to access network 310 using an additional device, the additional device can be similarly registered with central gateway 320, and in turn an additional charge for using network 310 can be applied. Similarly, the number of devices can be reduced by removing the registration of one or more of the devices, and in turn the cost of accessing network 310 can be reduced.

In other embodiments, a customer could be charged for bandwidth supported by modem 340. In such cases, any number of devices could access network 310 with the charge to the customer being related to the amount of bandwidth consumed. This bandwidth consumption can be monitored and billed using functions associated with central gateway 320.

As will be discussed in more detail below, some embodiments of the present invention include a central gateway 320 that additionally authorizes and charges for access to network 310 via a wireless access point 370 that is not necessarily approved by a customer that installed wireless access point 370. For example, a customer may contract with a Carrier for a certain amount of bandwidth and/or a certain number of devices. In addition, the customer installs a wireless access point 370 allowing the customer to access network 310 via wireless client devices 440 which may operate within the bandwidth and/or device number limitations of the contracted service. The Carrier may provide excess bandwidth which could be used by other wireless client devices 440 unrelated to the customer. The wireless client devices 440 can access network 310 via the customer's wireless access point 370. The wireless client devices 440 are then identified to central gateway 320 where they are authenticated and/or authorized to access network 310. A charge associated with accessing network 310 can then be attributed to the identified wireless client device 440, and the charge directed to a party responsible for the device.

Such an approach provides significant advantages. For example, among other advantages, the approach allows for roaming wireless client devices 440. Other client devices such as a laptop computer could roam to other locations, connect to the central gateway via a modem at the roamed-to location, and obtain network access if authorized to do so. Such network access could be granted by authorizing with an ISP that is contracted by the owner of the laptop computer. Such roaming devices can transfer information to/from network 310 via a wireless access point 370 located at one customer premises, and subsequently transfer information to/from network 310 via a wireless access device located at another customer premises. In both cases, the charge for accessing the network can be attributed to the wireless client device 440, rather than to the party associated with the customer premises.

Another exemplary advantage is the ability to extend the reach of an existing network at very little cost to a Carrier. It is not uncommon for a network to exhibit holes, or areas where certain network access is not available. For example, it may be the case that one neighborhood has xDSL access to a network, while an adjoining neighborhood does not. In such cases, embodiments of the present invention provide for installing one or more wireless access points 370 in the neighborhood where the xDSL access is available, thus allowing for wireless access to the network from homes in a neighborhood where the xDSL access is not directly available.

In addition, there are typically areas that are beyond the coverage of a given network. Embodiments of the present invention provide for extending the boundary of the network by supporting access to the network via wireless access points 370 installed at customer premises located at or near the boundary of the network.

Figure 6A:
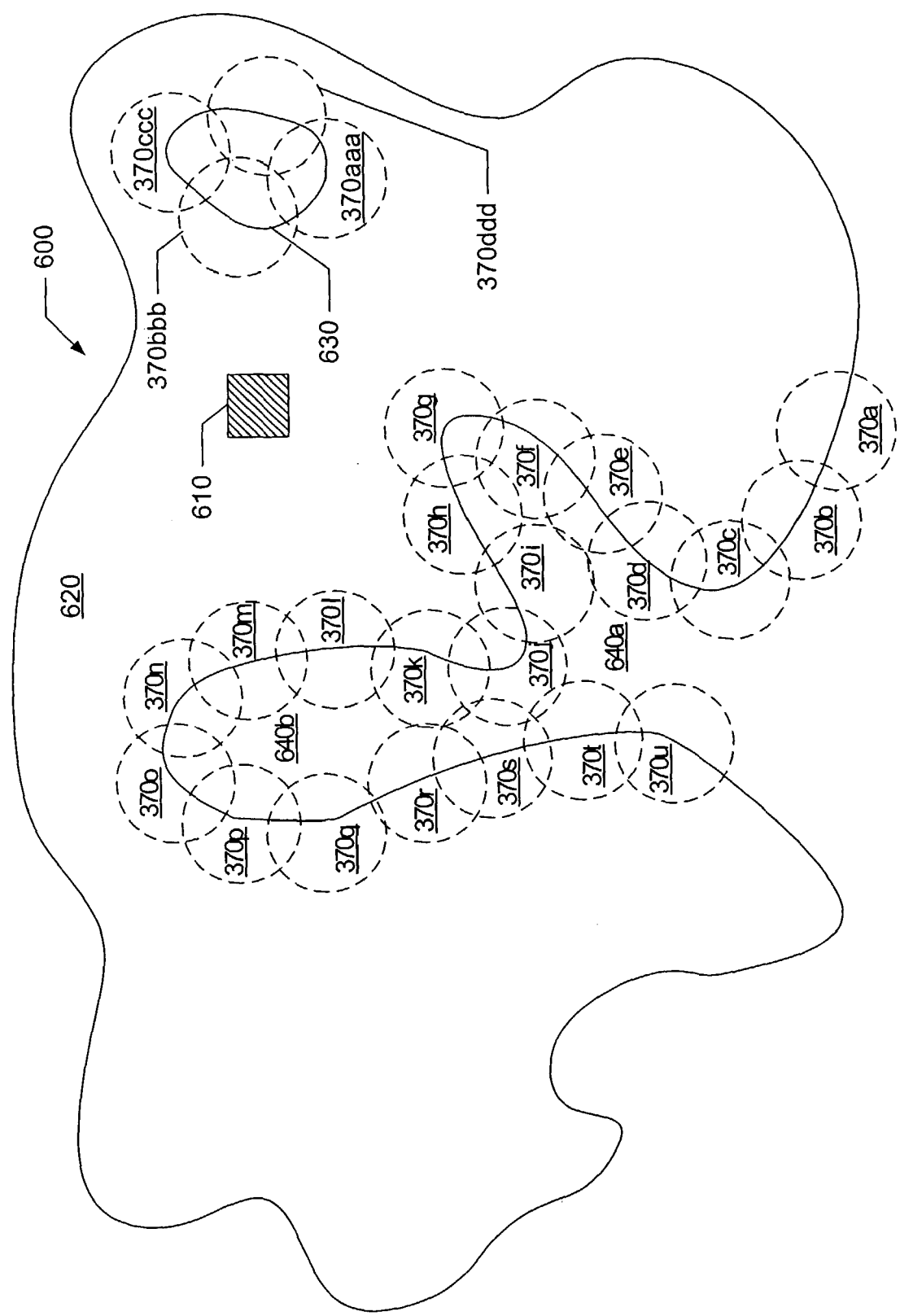
FIGS. 6 through 7 illustrate hole filling and/or coverage extension of a network using systems and method in accordance with the present invention.

FIG. 6 illustrate embodiments of the present invention where holes are filled and the boundary of a network is extended. Turning to FIG. 6a, a network 600 is illustrated that includes a wireline network 620 extending to the boundary defined by the solid line. A central office 610 is included where, for example, a central gateway 320 may be installed and maintained. Various holes 630, 640 are illustrated where the wireline network does not extend. A number of wireless access points 370a-370u and 370aaa-370ddd are illustrated as dashed circles representing the area served by the particular wireless access point 370. As depicted, hole 630 is eliminated through use of wireless access points 370aaa-370ddd operating at the boundary of the hole. Further, hole 640 is substantially covered by the wireless access points 370a-370u operating at its boundary.

Figure 2:
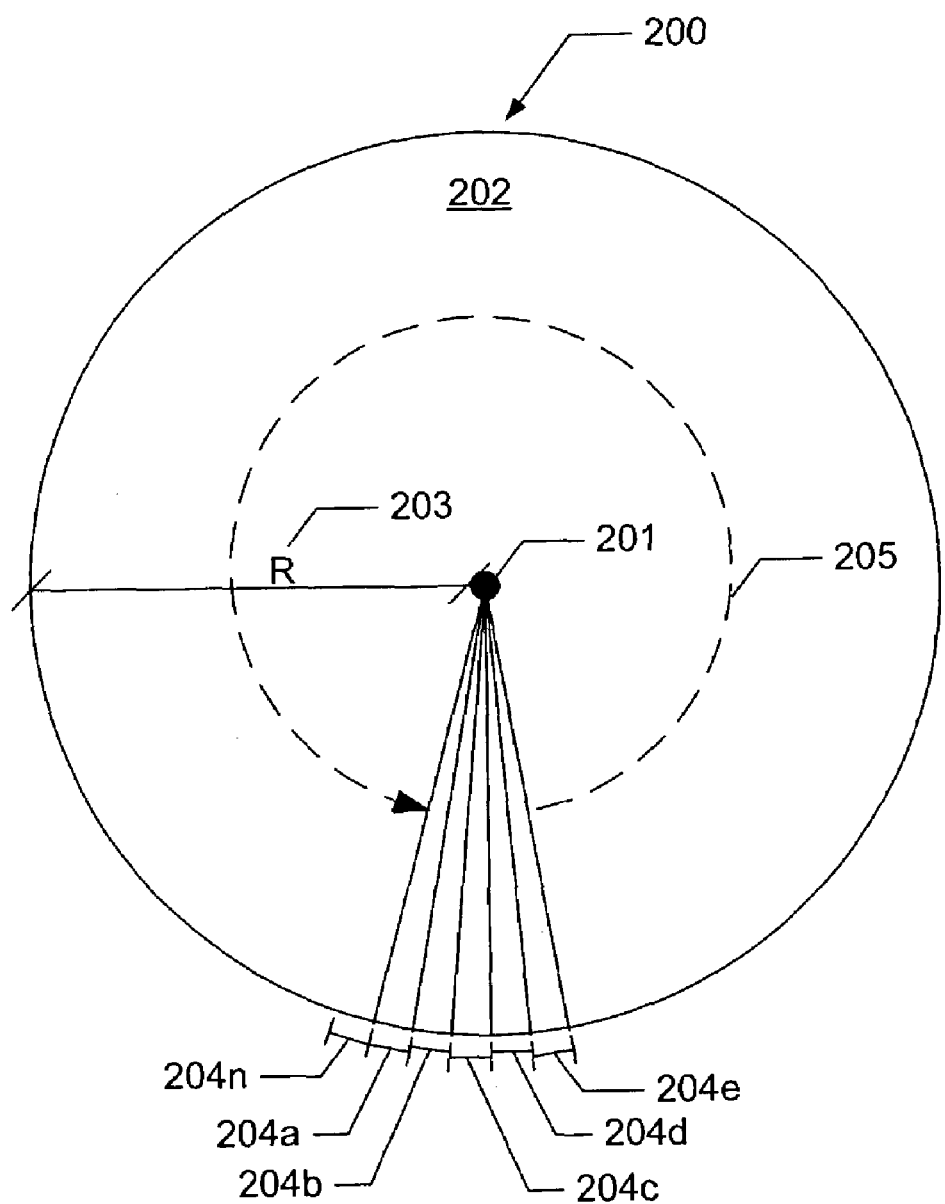
FIG. 2 illustrates a high power, point-to-point access point operating in a three hundred, sixty degree arc as is known in the art.
Figure 6B:
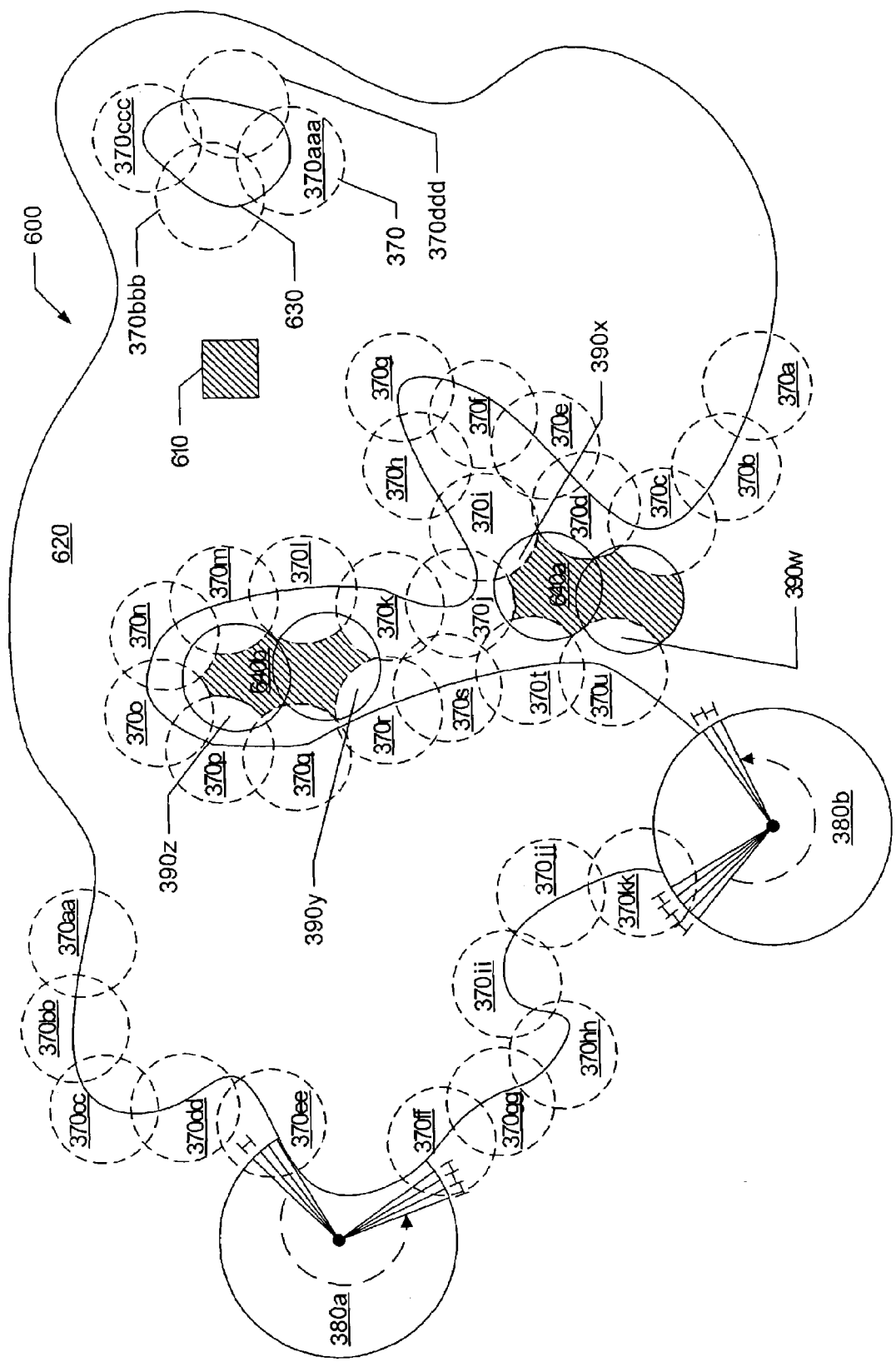

Central areas of hole 640 are, however, not covered. Turning to FIG. 6b, stand alone wireless access points 390w, 390x, 390y, 390z operating beyond a customer premises may be added to cover otherwise uncovered areas of hole 640. While implementing and maintaining such stand alone wireless access points 390w, 390x, 390y, 390z is more costly that wireless access points located at a customer premises, the number of such stand alone access points is reduced making the cost less significant. The coverage area of wireless access points 390w, 390x, 390y, 390z may not be a circular as illustrated. Rather, a more accurate coverage area, such as an oblong coverage area may be implemented as will be appreciated by those of ordinary skill in the art. Also depicted in FIG. 6b is the extension of the boundary of network 620 through use of a number of wireless access points 370aa-370kk. In addition, the boundary can be extended even further by adding high power, point-to-point access points 380 at the boundary of network 620. Such point-to-point access points can operate similarly to that described in relation to FIG. 2 above, however, a full 360 degrees of coverage is not provided. Rather, the rotation is selected to conform to the boundary of network 620. Thus, for example, at the location of access point 380a, approximately two-hundred degrees of coverage can be used, while at the location of access point 380b, approximately two-hundred, fifty degrees of coverage can be used. Further, the pattern does not have to proceed sequentially through the coverage area, but rather can appear random, and controlled by a number of algorithms that may select order, location bandwidth, duration, and the like based on various criteria which would include subscriber priority, subscription rates, signal strength and the like. Based on the disclosure provided herein, one of ordinary skill in the art will appreciate a number of combinations of stand alone access points, point-to-point access points, and customer premises access points that can be combined to fill holes and extend network coverage in accordance with embodiments of the present invention. It should be noted that the physical location of wireless access points can be anywhere within or without network 620. For example, wireless access points may be located at a customer premises, on a light pole, as a stand alone antenna, at a network equipment location such as a central office or a remote terminal, or on a mobile object such as a Taxicab.

Figure 7:
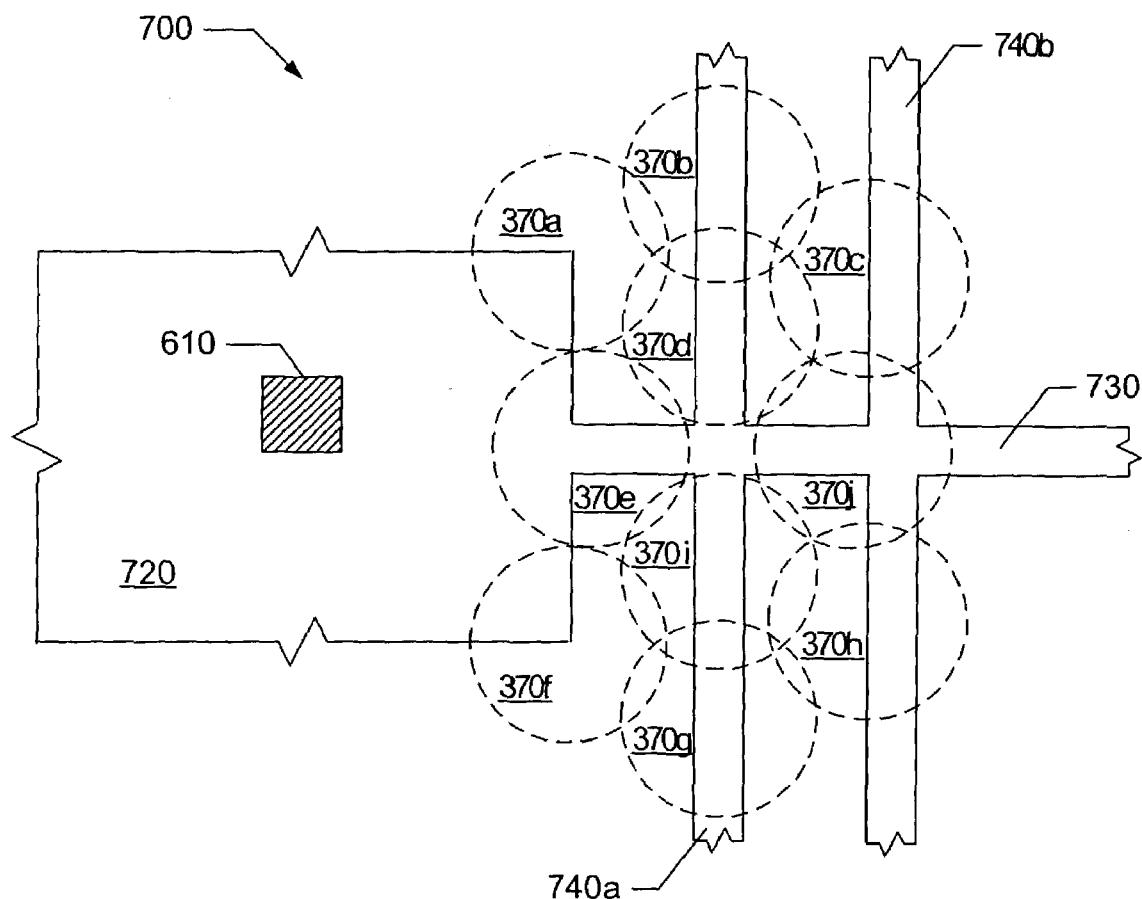

FIG. 7 illustrates another example of using wireless access points 370 in accordance with embodiments of the present invention to form a network 700 including both wireline and wireless access points formed in a planned coverage arrangement. In particular, a main wireline network 720 surrounding a central office 610 is augmented by a horizontal wireline trunk 730 and vertical wireline trunks 740. Wireless access points 370a-370j are installed at customer premises to cover areas that do not include wireline access to network 700. As will be appreciated, a network can be planned in accordance with embodiments of the present invention to take advantage of cost and access advantages of providing a combination of wireline access to some customer premises, and supporting wireless access via such customer premises.

Figure 8:
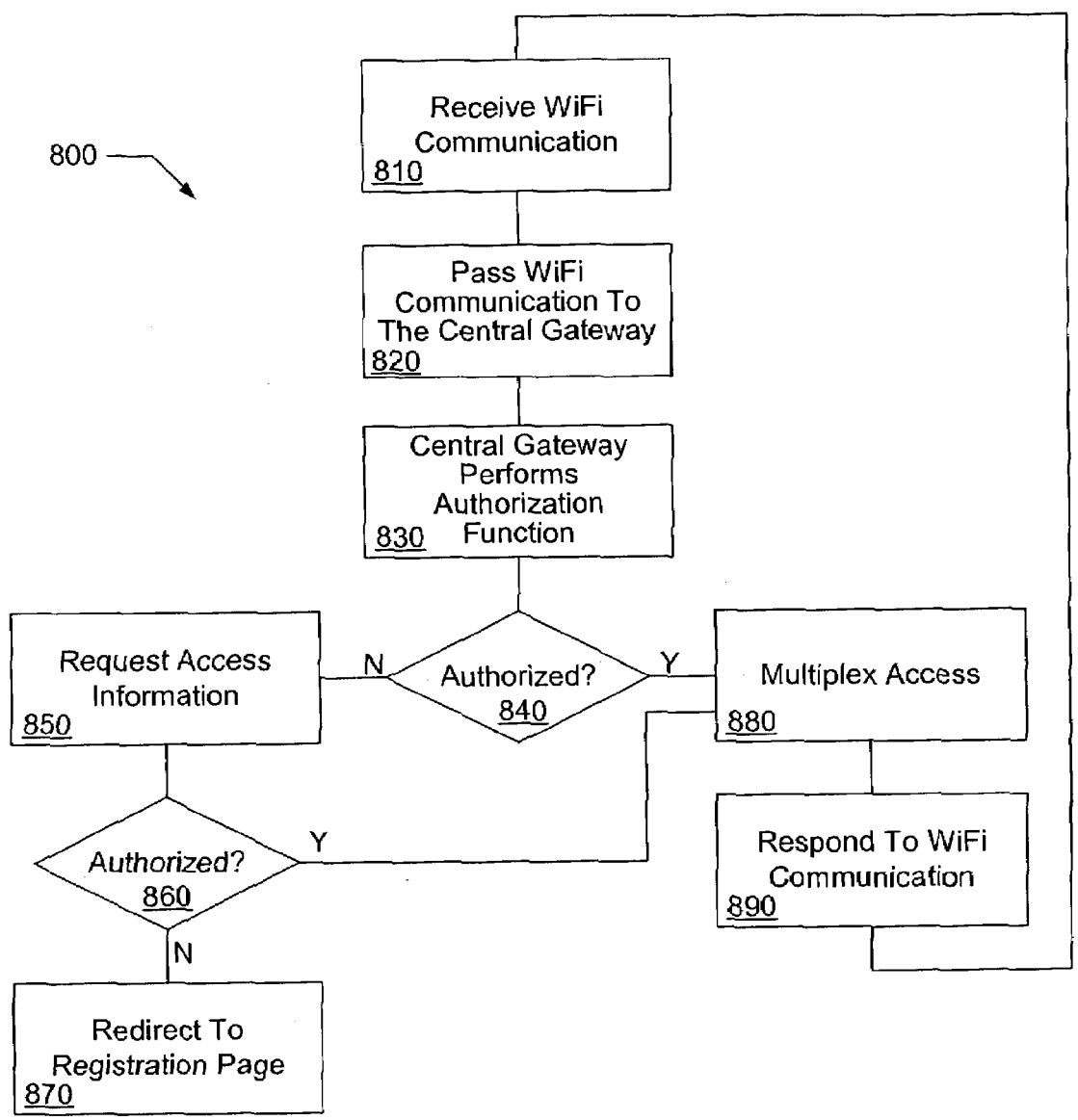
FIG. 8 is a flow diagram of a method in accordance with the present invention for operating networks such as those depicted in FIGS. 6 through 7.

Turning to FIG. 8, a flow diagram 800 illustrates functionality that can be implemented by a central gateway 320 in accordance with some embodiments of the present invention. Following flow diagram 800, a wireless communication is received from a wireless client device 440 at a wireless access point 370 (block 810). The communication is passed to central gateway 320 (block 820). In some cases, this can include performing some gateway function implemented by the customer at the customer premises to protect and/or authorize access to devices at the customer premises.

Central gateway 320 then performs an authorization function (block 830). As just one example, this authorization function can include querying the communication received from wireless client device 440 to identify the device, and accessing a database to determine whether the device is registered with the network. In one particular embodiment, the device is identified using a MAC associated with the device and provided as part of the communication from the device. However, based on the disclosure provided herein, one of ordinary skill in the art will understand that a number of methods for identifying the device can be used in accordance with the present invention. As will also be appreciated by one of ordinary skill in the art, this authorization function can utilize an extensive database that would not be available to a gateway function implemented at the wireless access point 370.

Alternatively, or in addition, this authorization function can include accessing the database to determine whether the device is a suspicious device that is not allowed to access the network. A suspicious device can be any device that has made too many unsuccessful attempts to access the network, or a device that has been associated with malicious or undesirable activity in relation to the network. Again, this function can utilize an extensive database that would not be available to a gateway function implemented at the wireless access point 370. As just one example, a wireless client device 440 that is identified as a suspicious device can be precluded from accessing the network from any wireless access point 370. This is not possible where the gateway function is performed local to each wireless access point 370. Thus, by implementing a central gateway 320, the ability to continue attacking, or otherwise misusing network resources by roaming from one wireless access point to another is limited.

If it is determined that the wireless client device is not authorized (block 840), additional authorization information can be requested of the device (block 850). For example, where the MAC address of the device is not registered, a user may be asked for the user's Carrier account number, or other identifying information. This information can be used to authorize the user, and to register the MAC of the device for future use. Where the user fails to provided authentic access information (block 860), the user may be directed to a web page that includes directions for establishing an account and/or registering a wireless client device for access to the network (block 870). Such a web page may be capable of accepting a credit card payment such that a user could be granted immediate access to the network upon application of a charge to the credit card.

Alternatively, where the device is found to be registered (block 840), or the user provides authentic access information (block 860), a response to the communication is provided (blocks 880, 890). This can include a rate shaping process whereby the access to the network via the wireless client device shares bandwidth with accesses to the network by devices associated with the customer providing the wireless access point 370 at the customer premises (block 880). This can be a simple multiplexing operation as discussed below in relation to FIG. 9, or another more complicated rate shaping function as is known by those of ordinary skill in the art. With the rate shaping performed, a response to the communication is provided (block 890). This can include, for example, serving a web page requested by the wireless communication device 440.

Figure 9:
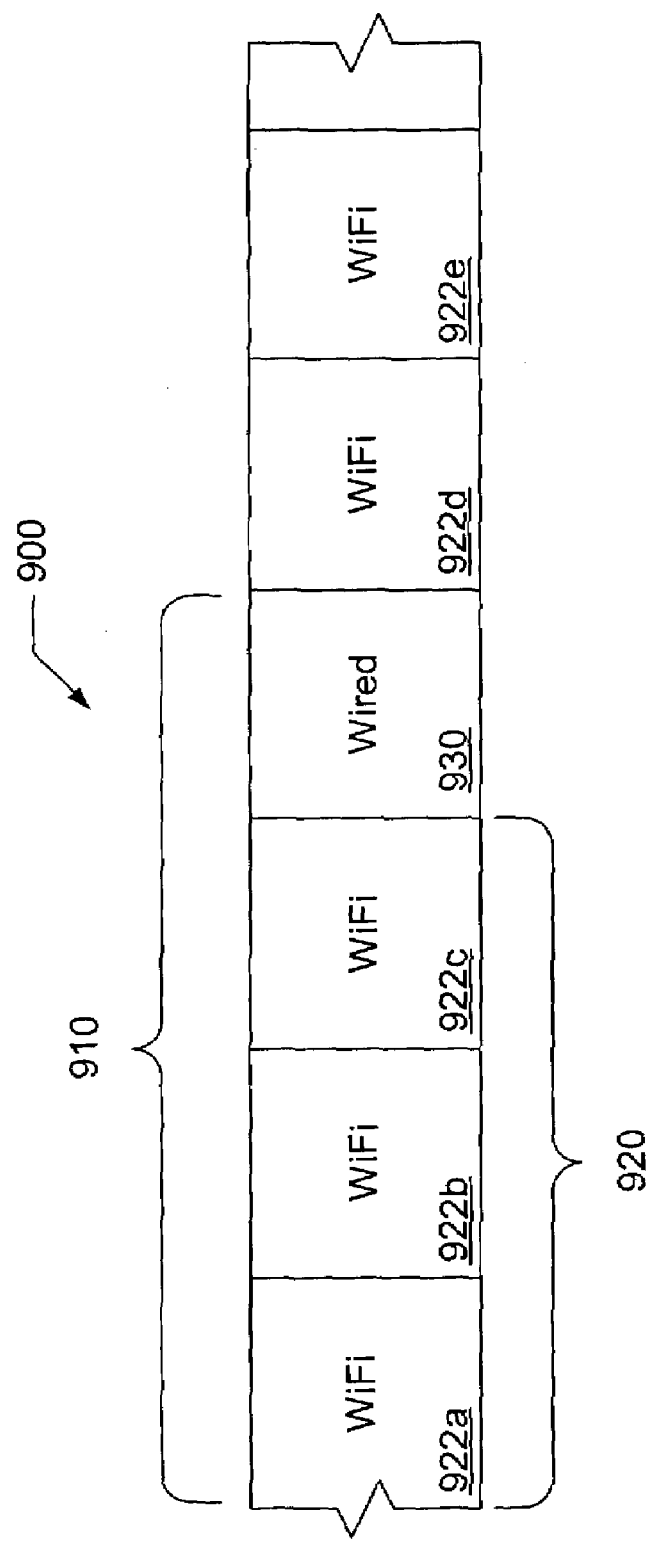
FIG. 9 logically illustrates an exemplary rate shaping method useful in relation to various embodiments of the present invention.

As previously stated, FIG. 9 illustrates a rate shaping approach where transfers associated with devices registered with the customer maintaining a wireless access point 370 at a customer premises are multiplexed with transfers associated with wireless client devices that are not registered to the customer. The exemplary rate shaping approach includes a frame 910 of four transfer slots 922a-922c and 930. The customer is granted every fourth transfer slot 930, while others are granted a series 920 of three consecutive transfer slots 922a-922c. This may be consistent with a customer's service agreement that, for example, provides the customer with one unit of bandwidth, while the modem coupling the customer premises to the network supports four units of bandwidth. By performing such a multiplexing function, the customer is guaranteed the bandwidth that they are paying for, while allowing the excess bandwidth to be utilized by wireless client devices unassociated with the customer. In some cases, a customer may be offered additional bandwidth as an incentive to install and maintain a wireless access point. For example, a customer may be allowed to use all, or some percentage of transfer slots that are not currently being utilized by a wireless client device. Thus, in some instances, bandwidth available to the customer may fluctuate, but never dip below the contracted level. Based on the disclosure provided herein, one of ordinary skill in the art will appreciate a number of different approaches to rate shaping that can be used, both to share bandwidth and to provide incentives to customers to install and maintain wireless access points.

Figure 10:
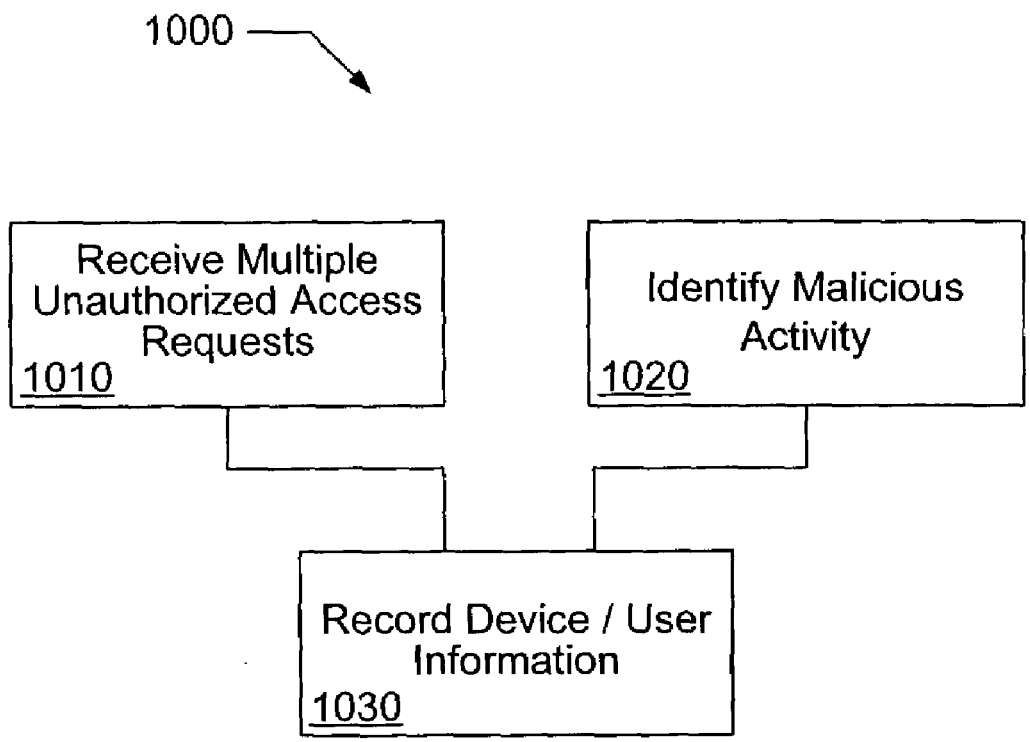
FIG. 10 is a flow diagram illustrating a method in accordance with the present invention for updating a database with malicious and/or unauthorized access information.

Turning to FIG. 10, a flow diagram 1000 illustrates a method in accordance with the present invention for maintaining an authorization database. Following flow diagram 1000, a wireless client device is detected making multiple unauthorized accesses (block 1010) and/or a wireless client device is identified as participating in malicious or otherwise detrimental activities in relation to the network or devices coupled to the network (block 1020). The device and/or user associated with the device is then recorded to a database (block 1030). This database can then be accessed by central gateway 320 in relation to future authorizations of the device.

The invention has now been described in detail for purposes of clarity and understanding. However, it will be appreciated that certain changes and modifications may be practiced within the scope of the appended claims. Further, the functions of the systems and methods of using such are merely exemplary. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method of providing network access, comprising:
   receiving a first request from a first wireless device to access a network via a first wireless access point at a first customer premises operated by a first operator, wherein the first wireless device is registered with the first operator;
   forwarding the first request from the first wireless access point to a gateway located within the network, wherein the gateway is located at a location different from the first customer premises;
   at the gateway, determining to provide the first wireless device access to the network and recording information about the first wireless device;
   transmitting a set of data from the first wireless access point to the network, wherein the set of data includes data from the first wireless device and data from a second wireless device, and wherein the second wireless device is not registered with the first operator;
   recognizing undesirable activity by the first wireless device and recording information at the gateway that identifies the first wireless device as a suspicious device;
   receiving a second request from the first wireless device to access the network via a second wireless access point at a second customer premises operated by a second operator;
   forwarding the second request from the second wireless access point to the gateway, wherein the gateway is located at a location different from the second customer premises; and
   at the gateway, determining to deny access to the network by the first wireless device based on the identification of the first wireless device as a suspicious wireless device.

2. The method of providing network access of claim 1, wherein the method further comprises:
   attributing a first billing charge to a party responsible for the second wireless device; and
   attributing a second billing charge to the first operator.

3. The method of providing network access of claim 1, wherein the set of data comprises data from the first wireless device multiplexed with data from the second wireless device.

4. The method of providing network access of claim 1, wherein undesirably activity by the first wireless device comprises unsuccessful attempts by the first device to access the network.

5. The method of providing network access of claim 1, wherein the first wireless device comprises a roaming wireless device roaming from the first customer premises to the second customer premises.

6. The method of providing network access of claim 1, wherein the first wireless access point is a Wi-Fi access point.

7. The method of providing network access of claim 1, wherein the first wireless access point is coupled with the network via an xDSL modem.

8. The method of providing network access of claim 1, wherein the first wireless access point is coupled directly to a network equipment location.

9. A system for providing network access, comprising:
   a first wireless access point, wherein:
      the first wireless access point is located at a first customer premises operated by a first operator;
      the first wireless access point is configured to receive a first request from a first wireless device to access a network via the first wireless access point, wherein the first wireless device is registered with the first operator; and
      the first wireless access point is further configured to transmit a set of data from the first wireless access point to the network, wherein the set of data includes data from the first wireless device and data from a second wireless device, and wherein the second wireless device is not registered with the first operator;

a second wireless access point, wherein:
  the second wireless access point is located at a second customer premises operated by a second operator; and
  the second wireless access point is configured to receive a second request from the first wireless device to access the network via a second wireless access point; and
a gateway, wherein:
  the gateway is located within the network;
  the gateway is located at a location different from the first customer premises and the second customer premises;
  the gateway is configured to receive the first request from the first wireless access point;
  the gateway is further configured to determine whether to provide the first wireless device access to the network and record information about the first wireless device;
  the gateway is further configured to recognize undesirable activity by the first wireless device via the first wireless access point and record information at the gateway that identifies the first wireless device as a suspicious device;
  the gateway is further configured to receive the second request from the second wireless access point; and
  the gateway is further configured to determine to deny access to the network via the second wireless access point by the first wireless device based on the identification of the first wireless device as a suspicious wireless device.

10. The system for providing network access of claim 9, wherein the gateway is further configured to:
  attribute a first billing charge to a party responsible for the second wireless device; and
  attribute a second billing charge to the first operator.

11. The system for providing network access of claim 9, wherein the set of data comprises data from the first wireless device multiplexed with data from the second wireless device.

12. The system for providing network access of claim 9, wherein undesirably activity by the first wireless device comprises unsuccessful attempts by the first device to access the network.

13. The system for providing network access of claim 9, wherein the first wireless device comprises a roaming wireless device roaming from the first customer premises to the second customer premises.

14. The system for providing network access of claim 9, wherein the first wireless access point is a Wi-Fi access point.

15. The system for providing network access of claim 9, wherein the first wireless access point is coupled with the network via an xDSL modem.

16. The system for providing network access of claim 9, wherein the first wireless access point is coupled directly to a network equipment location.

* * * * *